United States Patent
Sengodan

(10) Patent No.: US 11,491,879 B2
(45) Date of Patent: Nov. 8, 2022

(54) SEQUENTIAL ELECTRICAL BRAKING WITH PULSED DC INJECTION ROTOR LOCK MECHANISM

(71) Applicant: Hamilton Sundstrand Corporation, Charlotte, NC (US)

(72) Inventor: Rajkumar Sengodan, Tamilnadu (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 53 days.

(21) Appl. No.: 17/101,310

(22) Filed: Nov. 23, 2020

(65) Prior Publication Data
US 2021/0155097 A1 May 27, 2021

(30) Foreign Application Priority Data
Nov. 27, 2019 (IN) .............................. 201911048636

(51) Int. Cl.
| | |
|---|---|
| *H02P 7/10* | (2006.01) |
| *B60L 7/10* | (2006.01) |
| *B60L 7/26* | (2006.01) |
| *B60L 15/20* | (2006.01) |
| *H02P 3/14* | (2006.01) |

(52) U.S. Cl.
CPC .................. *B60L 7/10* (2013.01); *B60L 7/26* (2013.01); *B60L 15/2009* (2013.01); *H02P 3/14* (2013.01); *B60L 2240/421* (2013.01)

(58) Field of Classification Search
CPC .......... B60L 7/10; B60L 7/26; B60L 15/2009; H02P 3/14
USPC .......................................................... 318/376
See application file for complete search history.

(56) References Cited

U.S. PATENT DOCUMENTS

| | | | |
|---|---|---|---|
| 4,039,914 | A | 8/1977 | Steigerwald et al. |
| 4,216,420 | A | 8/1980 | Jinbo et al. |
| 4,296,362 | A | 10/1981 | Beasley |
| 5,406,126 | A | 4/1995 | Hadley et al. |
| 5,644,202 | A | 7/1997 | Toriyama et al. |
| 6,078,156 | A | 6/2000 | Spurr |
| 6,930,458 | B2 | 8/2005 | Akiyama et al. |
| 7,560,884 | B2 | 7/2009 | Shu et al. |
| 8,424,347 | B2 | 4/2013 | Maekawa et al. |

(Continued)

FOREIGN PATENT DOCUMENTS

| | | |
|---|---|---|
| GB | 2474321 A | 4/2011 |
| WO | 2014031112 A1 | 2/2014 |

OTHER PUBLICATIONS

European Search Report issued in European Application No. 20210084.8; Application Filing Date Nov. 26, 2020; dated May 10, 2021 (8 pages).

*Primary Examiner* — Erick D Glass
(74) *Attorney, Agent, or Firm* — Cantor Colburn LLP

(57) ABSTRACT

A regenerative braking system includes a motor configured to rotate at a variable rotational speed in response to receiving power from a three-phase power supply, and a regenerative braking circuit in signal communication with the three-phase power supply to control the rotational speed of the motor. A brake controller is in signal communication with the regenerative braking circuit and is configured to selectively operate the regenerative braking circuit in a plurality of different braking modes based on the rotational speed of the motor.

12 Claims, 8 Drawing Sheets

(56) References Cited

U.S. PATENT DOCUMENTS

| | | | |
|---|---|---|---|
| 8,952,648 B2* | 2/2015 | Suel, II | D06F 37/42 |
| | | | 318/375 |
| 2009/0037073 A1* | 2/2009 | Jung | B60W 20/10 |
| | | | 701/101 |
| 2010/0050703 A1* | 3/2010 | Maekawa | H02P 3/18 |
| | | | 68/23 R |
| 2012/0013278 A1 | 1/2012 | Hanlon et al. | |
| 2013/0334818 A1 | 12/2013 | Mashal et al. | |

* cited by examiner

SEQUENTIAL ELECTRICAL BRAKING WITH PULSED DC INJECTION ROTOR LOCK MECHANISM

CROSS-REFERENCE TO RELATED APPLICATIONS

This application claims the benefit of Indian Application No. 201911048636 filed Nov. 27, 2019, which is incorporated herein by reference in its entirety.

BACKGROUND

Embodiments described herein generally relate to braking systems, and more specifically to, a regenerative motor electrical braking systems.

Motors are implemented in electrical braking systems (e.g., aircraft wheel braking system, elevator car braking systems, etc.) to perform a sporadic or periodic braking function where energy flows from a load into a motor, for example, when decelerating connected loads, lowering connected loads, retracting a load away from a compressed spring, or other similar situations. When motors are driven by electronic means as in a servo drive, a variable speed drive, or a stepper motor drive, then the braking energy is transferred back into drive circuitry as regenerated electrical energy. The regenerated energy is returned to the electronic motor inverter circuitry and then is efficiently transferred to a direct current (DC) voltage bus within the motor drive circuit. In applications that are powered by an AC (alternating current) line the regenerated energy is typically returned to a capacitor bank. Accordingly, as the energy in the capacitor bank increases so does the voltage across the capacitor bank. The energy stored in the capacitor bank can then be used to power the motor during subsequent motoring cycles (where the energy flows from the motor to the load).

BRIEF DESCRIPTION

According to an embodiment, a regenerative braking system includes a motor configured to rotate at a variable rotational speed in response to receiving power from a three-phase power supply, and a regenerative braking circuit in signal communication with the three-phase power supply to control the rotational speed of the motor. A brake controller is in signal communication with the regenerative braking circuit and is configured to selectively operate the regenerative braking circuit in a plurality of different braking modes based on the rotational speed of the motor.

According to another non-limiting embodiment, a method of performing regenerative electrical braking comprises rotating a motor configured at a variable rotational speed in response to receiving power from a three-phase power supply; and controlling the power generated by the three-phase power supply via a regenerative braking circuit. The method further comprises selectively operating the regenerative braking circuit in a plurality of different braking modes based on the rotational speed of the motor so as to reduce the rotational speed of the motor.

The foregoing features and elements may be combined in various combinations without exclusivity unless expressly indicated otherwise. These features and elements, as well as the operation thereof, will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Braking of a motor in an electric regenerative brake system is typically accomplished by disconnecting current flow to the motor windings after receiving a brake request to brake the motor. This technique, however, results in very high current transients and high power dissipated that overheats regenerative brake system. In addition, conventional regenerative brake systems are incapable of achieving motor stopping position accuracy and instead produces sudden and uncontrollable braking times that can be detrimental to the life of the motor system.

Dynamic braking typically has a nonlinear stopping behavior. In addition, the braking force decreases as the motor (e.g., rotational rotor speed) slows down. Therefore, it is difficult for dynamic braking system to achieve precision motor stopping positions. Other problem with conventional DC injection brakes is that it requires a constant DC power supply.

Various non-limiting embodiments described herein provides a regenerative electrical braking system capable of performing a pulsed DC (PWM) injection rotor locking operation, along with a dynamic braking technique. The regenerative electrical braking system includes a braking circuit that implements a feedback loop to monitor electromagnetic field (EMF) energy generated by the motor in response to being disconnected from the power supply. The EMF can be dissipated as heat using a brake resistor. The dissipated energy is utilized as regenerative power to be stored in charge storage element, which in turn reduces multifold the size of braking resistor.

In one or more non-limiting embodiments, the regenerated energy can be fed back to motor phase windings during the last 0% to 30% of the motor's speed, thereby improving the nonlinear stopping characteristics of the motor system. The charge stored in the charge storage elements can also be used as a DC power source during PWM injection braking scheme, which allows for eliminating the requirement of having a constant power supply as in conventional methods. Therefore, the regenerative braking system described herein can drive a motor by using the kinetic energy and can charge a battery/capacitor with electric energy generated from the motor in order to improve the efficiency of the regenerative brake system. In this manner, the regenerative braking system described herein can improve the energy consumption ratio and compliance to achieve fail-safe operation during dc injection braking.

Figure 1:
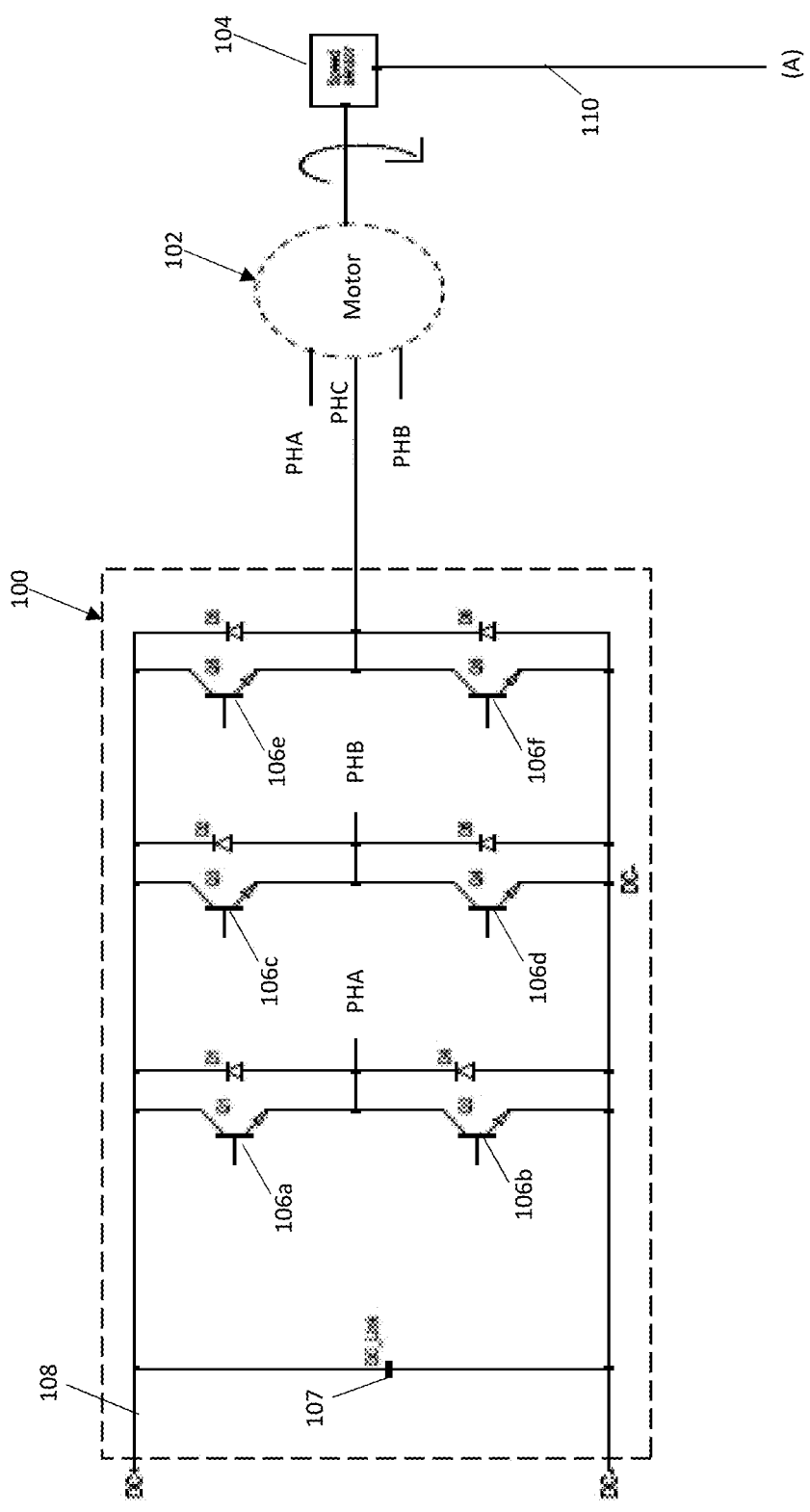
FIG. 1 is a schematic diagram of a three-phase motor inverter circuit for driving a regenerative braking circuit according to a non-limiting embodiment.

Turning now to FIG. 1, a three-phase AC motor inverter circuit 100 (sometimes referred to as a pulse-width modulation (PWM) rectifier circuit) in signal communication with a motor 102 is illustrated according to a non-limiting embodiment. The three-phase motor inverter circuit 100 includes a plurality (e.g., six) switches 106, and is configured to convert a filtered DC power supply (e.g., provided by a DC bus 108) into a three-phase power to the motor 102. The motor 102 includes, for example, a three-phase brushless DC (BLDC) motor 102 having a delta or star configuration. The switches 106 can include, but are not limited to, MOSFETs, IGBTs, IGCTs, etc., and are connected in an H-bridge configuration. A DC link capacitor 107 is connected in parallel with the switches 106, and is configured to store a voltage (e.g., 270 Vdc) necessary to operate a connected load.

The power induces rotation of the motor 102, and the synchronous speed (RPM) of the motor 102 is dependent upon frequency at which the power is delivered. Therefore, the synchronous speed of the motor 102 can be controlled by varying the frequency of the power supply provided by the inventor circuit 100. A speed sensor 104 is coupled to the motor 102 (e.g., a rotating shaft) and outputs a speed signal 110 indicating the rotational speed of the motor 102 at a given point in time.

Figure 2:
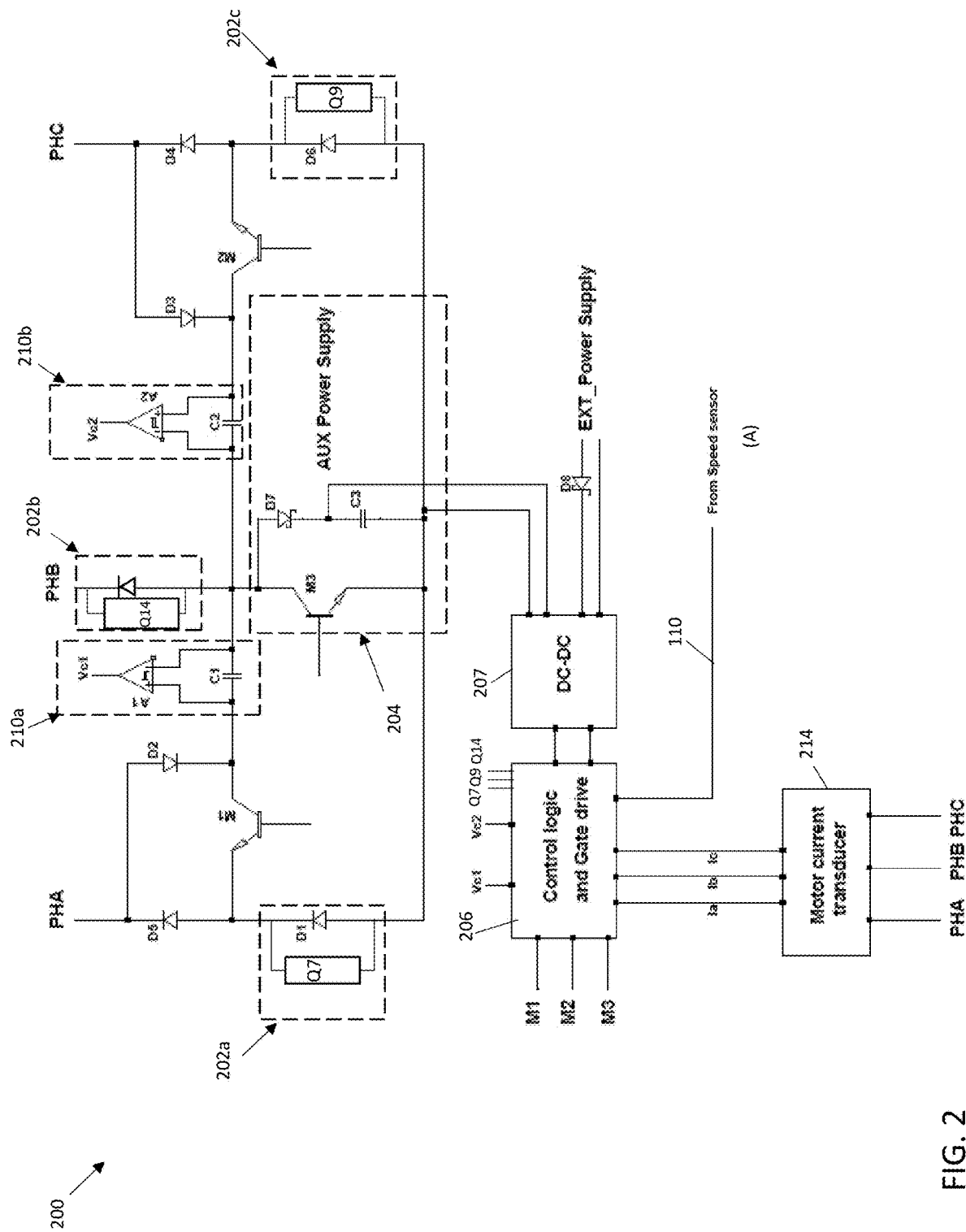
FIG. 2 is a schematic diagram of a regenerative braking circuit according to a non-limiting embodiment.

Turning to FIG. 2, a regenerative braking circuit 200 is illustrated according to a non-limiting embodiment. The regenerative braking circuit 200 is in signal communication with the inverter circuit 100, the motor 102 and a brake controller 206. The regenerative braking circuit 200 includes a plurality of brake switch units 202a, 202b, 202c and an auxiliary power supply 204, which operate together to facilitate different braking operations for reducing the rotational speed of the motor 102 as described in greater below.

Figure 3:
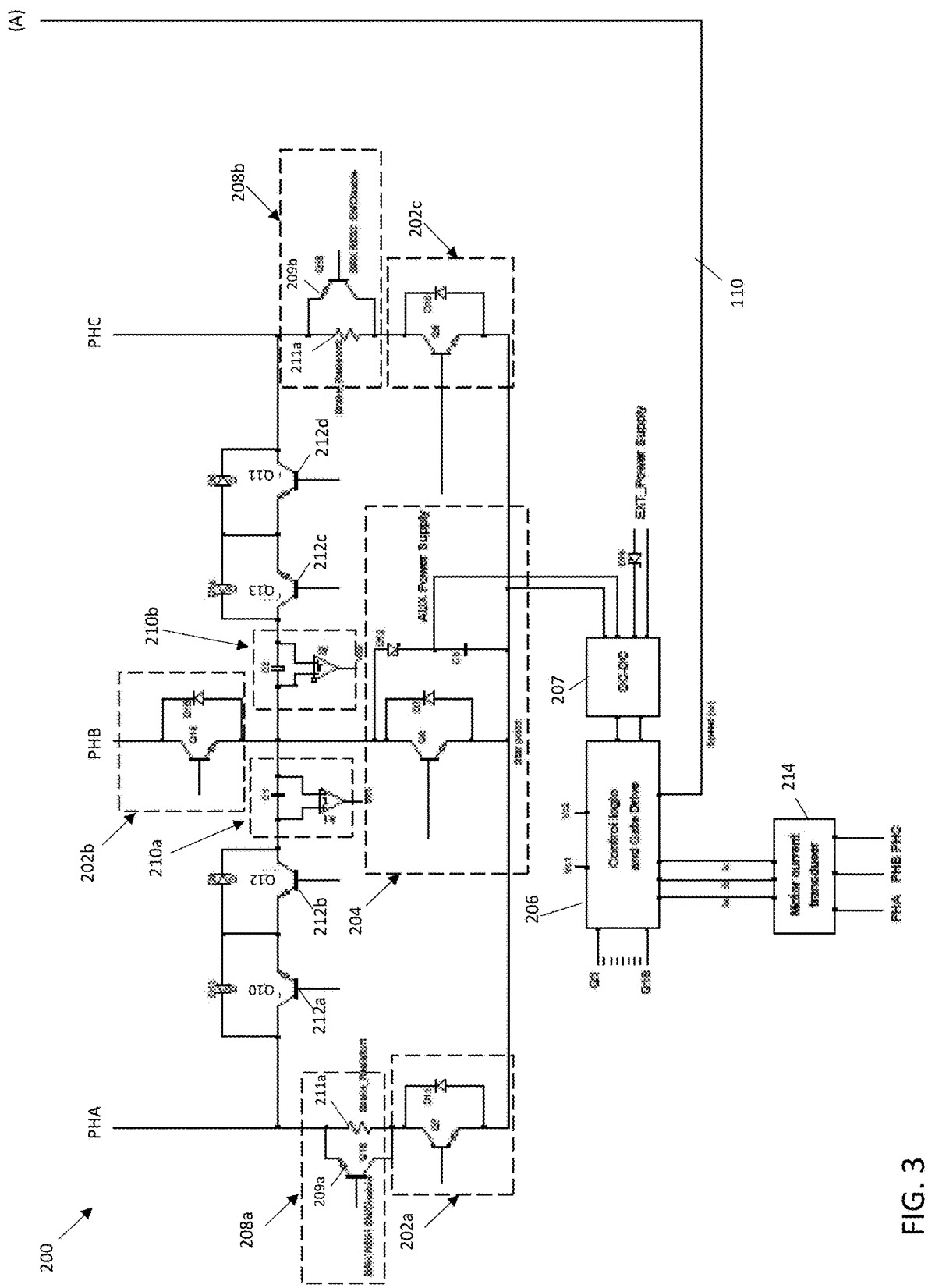
FIG. 3 is a schematic diagram of a regenerative braking circuit according to a non-limiting embodiment.

FIG. 3 illustrates another example of the regenerative braking circuit 200, which includes additional dynamic braking mode switching circuits 208a and 208b. A first dynamic braking mode switching circuit 208a is interposed between a first phase stator leg (e.g., PHA) and brake switch unit 202a, while a second dynamic braking mode switching circuit 208b is interposed between a second phase stator leg (e.g., PHC) and brake switch unit 202c. Accordingly, the regenerative braking circuit 200 can selectively invoke an additional dynamic braking mode as described in greater detail below. Along with regenerative braking, the dynamic braking can be performed between 100% and 30% of the motor rotation in order to achieve effective braking and to limit regenerative action. Alternatively, in cases where there is no regenerative action then full dynamic braking can be performed between 100% and 30% of the motor rotation.

The brake controller 206 is configured to selectively invoke a plurality of different braking modes based on the rotational speed of the motor 102, which in in turn operate the regenerative brake system according to a plurality of different braking operations. According to one or more non-limiting embodiments, the different braking modes include a regenerative braking mode, a pulsed DC injection braking mode, and a dynamic braking mode. The regenerative braking mode invokes a regenerative braking operation provided by the regenerative braking circuit 200, which can be applied while the motor 102 rotates so as to achieve a first reduced rotational speed that is less than a maximum rotational speed generated. The pulsed DC injection braking mode invokes a pulsed DC injection braking operation provided by the regenerative braking circuit 200, which can be applied while the motor 102 rotates so as to achieve a second reduced rotational speed that is less than the first reduced rotational speed generated. The dynamic braking mode invokes a dynamic braking operation, which is applied by the regenerative braking circuit 200 after the motor 102 is stopped (see FIG. 7).

During nominal operating conditions, the DC link capacitor 107 will store voltage necessary to drive the motor 102 at max speed, and the inverter circuit 100 is switched by pulsed gate signals generated by the brake controller 206 to provide a pulsed voltage for driving the motor 102. When a braking request is received (e.g., by the braking controller 206), the rotational speed of the motor 102 begins to decrease and the speed sensor 104 outputs a speed signal 110 indicating the reduced rotational speed. Accordingly, the braking controller 206 monitors the speed signal and selectively invokes the different braking operations based on the rotational speed. In one or more embodiments, the braking controller 206 sequentially invokes the regenerative braking operation, the pulsed DC injection braking operation, and the dynamic braking operation until the rotational speed is 0 RPMs and the magnetizing current through the motor stators is 0 amps (A).

The regenerative braking operation is capable of reducing the rotational speed of the motor 102 by converting its kinetic energy into a form that can be either used immediately or stored until needed. The recovered energy can be utilized to improve the braking system such as, for example, improving fuel consumption ratio.

Referring to FIGS. 1 and 2, the regenerative braking operation is facilitated using the DC link capacitor 107 while the motor 102 has a rotational speed that falls within a first speed threshold. The first speed threshold can range, for example, from about 100% of the motor maximum rotational speed to about 30% of the motor maximum rotational speed (see FIG. 7). While the motor 102 has a rotational speed that is within the first speed threshold, back EMF energy is stored in DC link capacitor 107 until it reaches an upper threshold vale. Once the DC link capacitor 107 reaches the upper threshold, the switches Q7, Q14, Q9 included in switch brake units 202a, 202b and 202c are switched on. Accordingly, a circulating current path is established that charges capacitors C1, C2 included in voltage monitoring circuits 210a and 210b along with capacitor C3 included in the auxiliary power supply 204.

Figure 4:
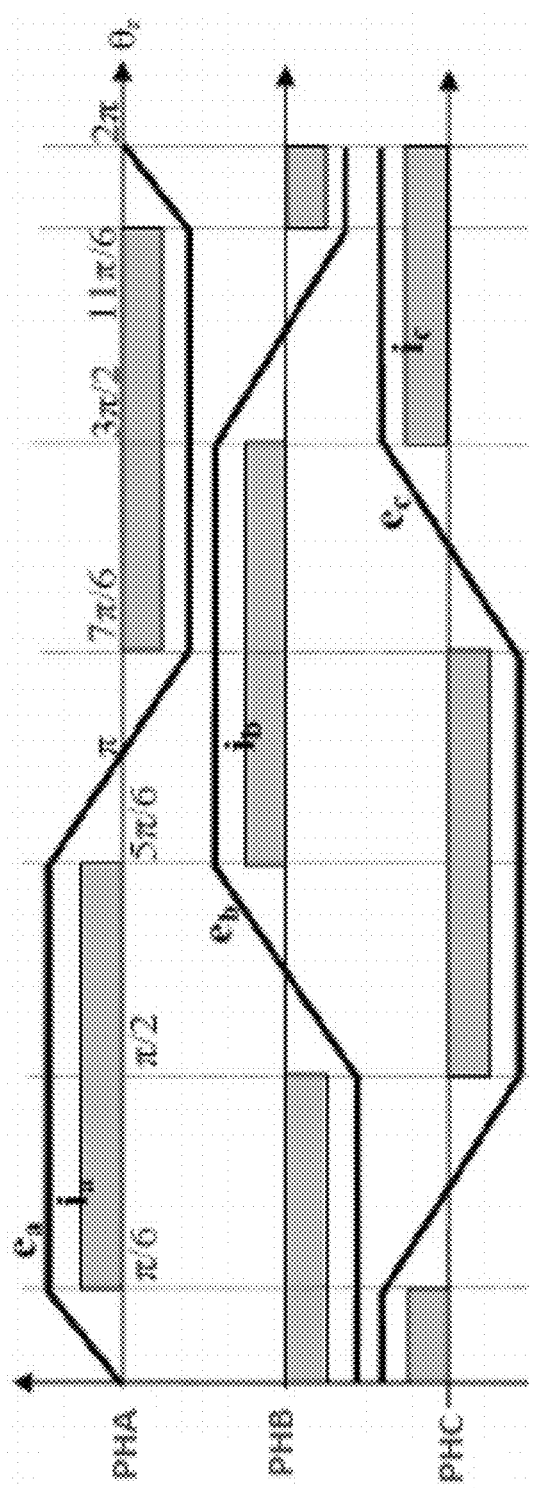
FIG. 4 is a voltage-phase diagram depicting the energizing phases of a motor with respect to time according to a non-limiting embodiment.

FIG. 4 illustrates a voltage-phase diagram depicting the energizing phases of the motor 107 with respect to time. When the DC link capacitor 107 charge reaches the upper threshold, the regenerative braking operation can perform a sequence of energy recovery cycles. Referring to the phase $\pi/2 < t < 5\pi/6$, capacitors C1, C2 and C3 have no stored energy during the initial period. The current path due to back-EMF can be expressed as PHA→Q10(On)→D9→C1→D12→C3→D10→dynamic braking mode switching circuit 208b→PHC.

During the phase 5π/6<t<7π/6, capacitor C3 included in the auxiliary power supply 204 will store energy and the current path due to back-EMF can be expressed as PHB→Q14(On)→D12→C3→D10→Q16→PHC. Similarly, during the phase 7π/6<t<3π/2 capacitor C3 included in the auxiliary power supply 204 will store energy and the current path due to back-EMF can be expressed as PHB→Q14(On)→D12→C3→D11→Q15→PHA.

During phase 3π/2<t<11π/6, capacitor C2 included in voltage monitoring circuit 210b will store energy and the current path due to back-EMF can be expressed as PHC→Q11(On)→D14→C2→D12→C3→D11→dynamic braking mode switching circuit 208a→PHA. Accordingly, the current path limits excessive current flow through capacitor C2 of the voltage monitoring circuit 210b. During phase 11π/6<t<π/6, capacitor C2 included in voltage monitoring circuit 210 will store energy and the current path due to back-EMF can be expressed as PHC→Q11(On)→D14→C2→D15→PHB. Similarly, during the phase π/6<t<π/2 capacitor C1 included in voltage monitoring circuit 210a will store energy and the current path due to back-EMF can be expressed as PHA→Q10(On)→D9→C1→D15→PHB.

During the subsequent cycles following the initial cycle described above, capacitors C1, C2 included in voltage monitoring circuits 210a and 210b along with capacitor C3 included in the auxiliary power supply 204 will continue storing energy. During phase π/2<t<5π/6, for instance, capacitor C1 included in voltage monitoring circuit 210a will store energy and the current path due to back-EMF can be expressed as PHA→Q10(On)→D9→C1→Q8(On)→D10→Q16(On)→PHC. During phase 5π/6<t<7π/6, capacitor C3 will store energy and the current path due to back-EMF can be expressed as PHB→Q14(On)→D12→C3→D10→Q16→PHC. During phase π/6<t<3π/2 capacitor C3 will store energy and the current path due to back-EMF can be expressed as PHB→Q14(On)→D12→C3→D11→Q15→PHA.

Similarly, during phase 3π/2<t<11π/6, capacitor C2 included in voltage monitoring circuit 210b will store energy and the current path due to back-EMF can be expressed as PHC→Q11(On)→D14→C2→Q8(On)→D11→Q15(On)→PHA. Accordingly, the current path limits excessive current flow through capacitor C2 of the voltage monitoring circuit 210b. During phase 11π/6<t<π/6, capacitor C2 included in voltage monitoring circuit 210 will store energy and the current path due to back-EMF can be expressed as PHC→Q11(On)→D14→C2→D15→PHB. During the phase π/6<t<π/2 capacitor C1 included in voltage monitoring circuit 210a will store energy and the current path due to back-EMF can be expressed as PHA→Q10(On)→D9→C1→D15→PHB.

With respect to embodiments that include the dynamic braking mode switching circuits 208a and 208b, the circulating current paths described above switches on (i.e., enables) switches 209a (Q15) and 209b (Q16), which provides lossless power across the respective brake resistors 211a and 211b. In this manner, the regenerative braking circuit 200 improves braking efficiency and reliability compared to conventional regenerative braking systems.

Referring again to FIGS. 1 and 2, the pulsed DC injection braking operation can be facilitated using the charged capacitors C1 and C2 in voltage monitoring circuits 210a and 210b, respectively, while the rotational speed of the motor 102 falls to within a second speed threshold. The second speed threshold can range, for example, from about 29% of the maximum motor speed to about 1%, or less (see FIG. 7). In one or more embodiments, the pulsed DC injection braking operation can be maintained after the motor 102 stops (i.e., beyond 0 RPMs) for a predetermined about of time or until the motor stator current is determined to be 0 A to prevent motor restart due to load inertia.

When invoking the pulsed DC injection braking operation, capacitor C3 included in the auxiliary power supply 204 serves as an auxiliary power source, which can power the brake controller 206 via DC-DC converter 207. For example, in response to receiving the brake request signal, the brake controller 206 initially invokes the regenerative braking mode so as to initiate the regenerative braking operation described above. Accordingly, the motor magnetic fields begin collapsing, thereby inducing a reduction in the motor speed.

After a predetermined time period or after rotational speed of the motor 102 falls below a speed threshold (e.g. below about 30% of the maximum motor speed), the brake controller 206 initiates the pulsed DC injection braking operation. The pulsed DC injection braking operation utilizes the energy recovered during the regenerative braking operation described above in order to apply a controlled increased braking torque until the motor 102 is stopped. In this manner, the pulsed DC injection braking operation reduces the risk of overheating the regenerative braking circuit 200, while providing efficient braking for stopping the motor 102 at a precise or targeted position The pulsed DC injection braking operation includes delivering a pulsed DC current to the motor stator windings (e.g., PHA, PHB, PHC), which induces a controlled increased braking torque that is applied to the motor 102. The brake controller 206 monitors the output of the speed sensor 104, and maintains the pulsed DC injection braking operation so as to apply the braking torque until the motor 102 is stopped. In some embodiments, the current can be injected into the motor stator windings (e.g., PHA, PHB, PHC) according to a fixed PWM duty cycle. For example, a fixed PWM duty cycle can be selectively applied by the brake controller 206 when the discharge rate of capacitors C1 and C2 is faster due to lesser charge density.

Figure 7:
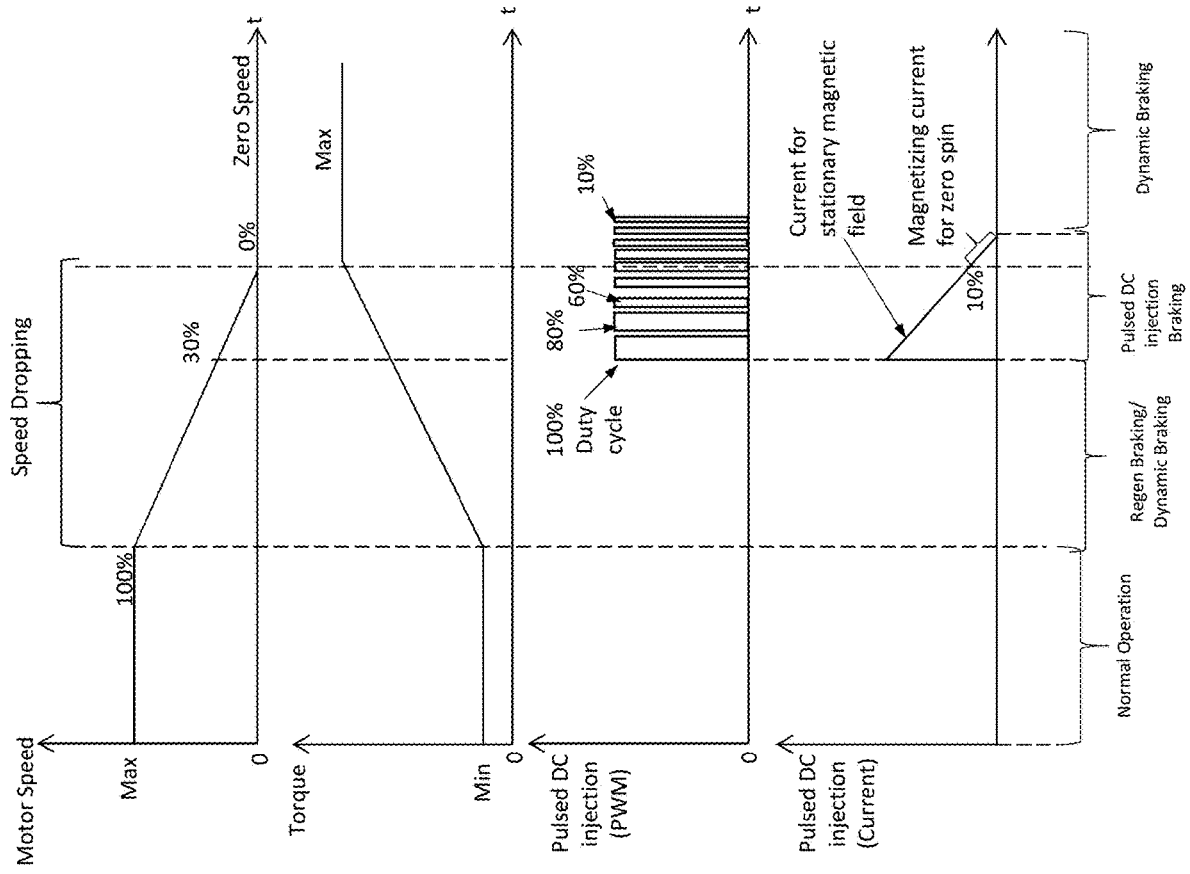
FIG. 7 depicts various signal timing diagrams associated with operation of the regenerative braking circuit according to a non-limiting embodiment.

In other embodiments, the current can be injected into the motor stator windings (e.g., PHA, PHB, PHC) according to a variable PWM duty cycle. As shown in FIG. 7, for example, the variable PWM duty cycle can be varied step-by-step in decreasing current order with respect to the reduction in motor speed. For example, the brake controller 206 can selectively apply a variable PWM duty cycle when the discharge rate of capacitors C1 and C2 is moderate or slow. Accordingly, the PWM duty cycle can be varied from 100% to 0% on each cycle to provide linear fall in the stationary magnetizing current with respect to the rotational speed of the motor 102. The pulsed DC injection technique allows the stator current to be limited and offers precise control over speed and torque.

The varied PWM duty cycle can be achieved using differential amplifier A1 and A2 included in the voltage monitoring circuits 210a and 210b, respectively. The differential amplifier A1 and A2 generate an output indicative of the charge in corresponding capacitors C1 and C2. Accordingly, the braking controller 206 can monitor the outputs of the differential amplifies and vary the gate control signals (e.g., gate voltages) applied to the pulsed injection PWM switches 212a (Q10), 212b (Q12), 212c (Q13) and 212d (Q11). In this manner, over-heating of the motor 102 (e.g., the rotor and stator coils) is reduced multifold instead of supplying a steady state voltage as is the case in conventional regenerative braking systems.

Figure 5:
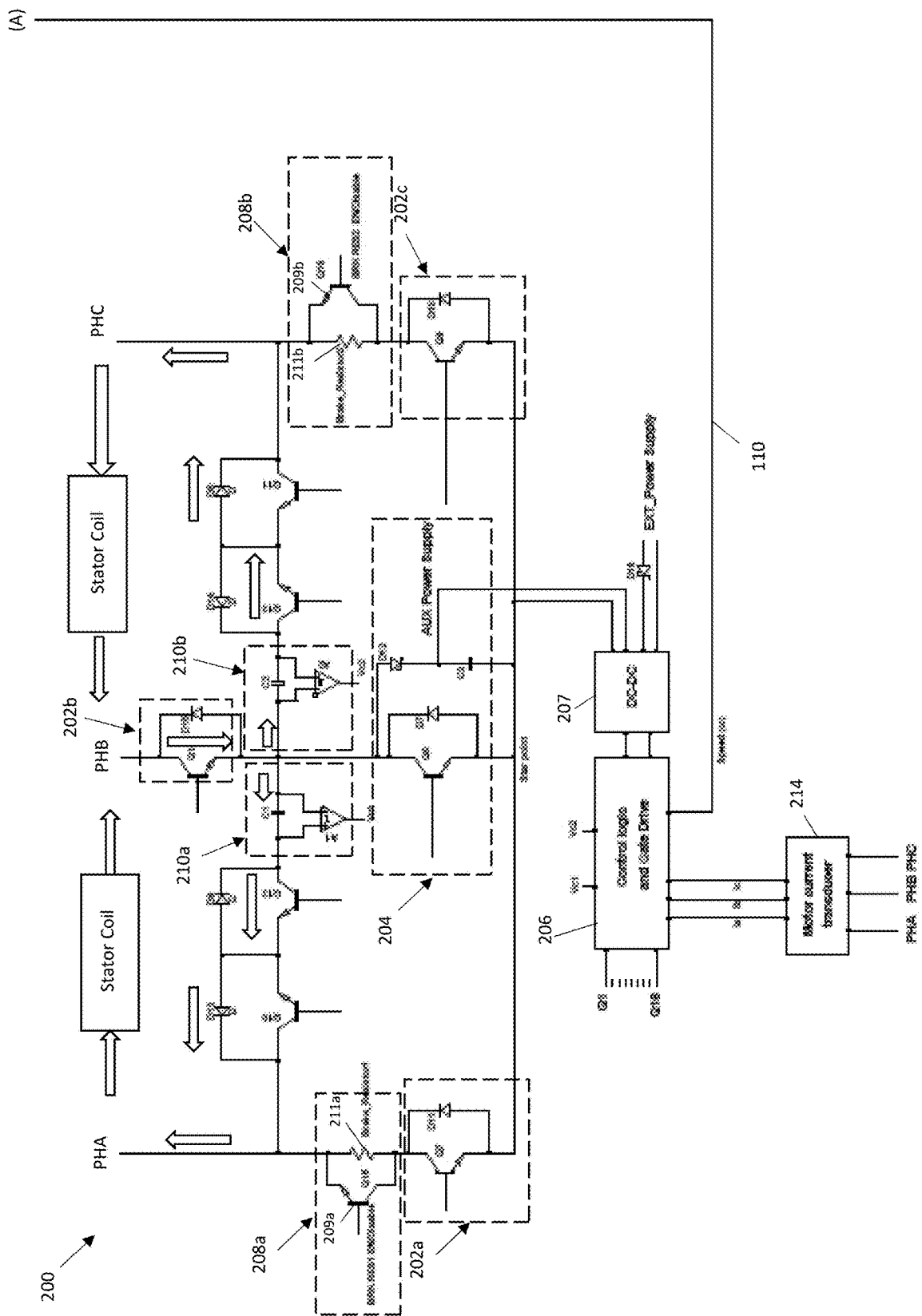
FIG. 5 depicts the regenerative braking circuit of FIG. 3 operating in a pulsed DC injection braking mode according to a non-limiting embodiment.

FIG. 5 illustrates the regenerative braking circuit 200 operating in the pulsed DC injection braking mode according to a non-limiting embodiment. When invoking the pulsed DC injection braking operation, the pulsed injection PWM switch Q12 is switched on, and capacitor C1 will discharge its stored energy to establish a current path that can be expressed as C1(+ve)→Q12 (On)→D13→PHA→star point node→PHB→Q14 (On)→C1(−ve). When the pulsed injection PWM switch Q12 is switched off, however, the stored winding inductive current freewheel establishes a current path that can be expressed as PHA→star point node→PHB→Q14(On)→Q8 (On)→D11→Q15.

Similarly, when the pulsed injection PWM switch Q13 is switched on, capacitor C2 will discharge its stored energy to establish a current path that can be expressed as C2 (+ve)→Q13 (On)→D8→PHC→star point node→PHB→Q14(On)→C2(−ve). When the pulsed injection PWM switch Q13 is switched off, however, the stored winding inductive current freewheel establishes a current path that can be expressed as PHC→star point node→PHB→Q14(On)→Q8(On)→D10→Q16.

Figure 6:
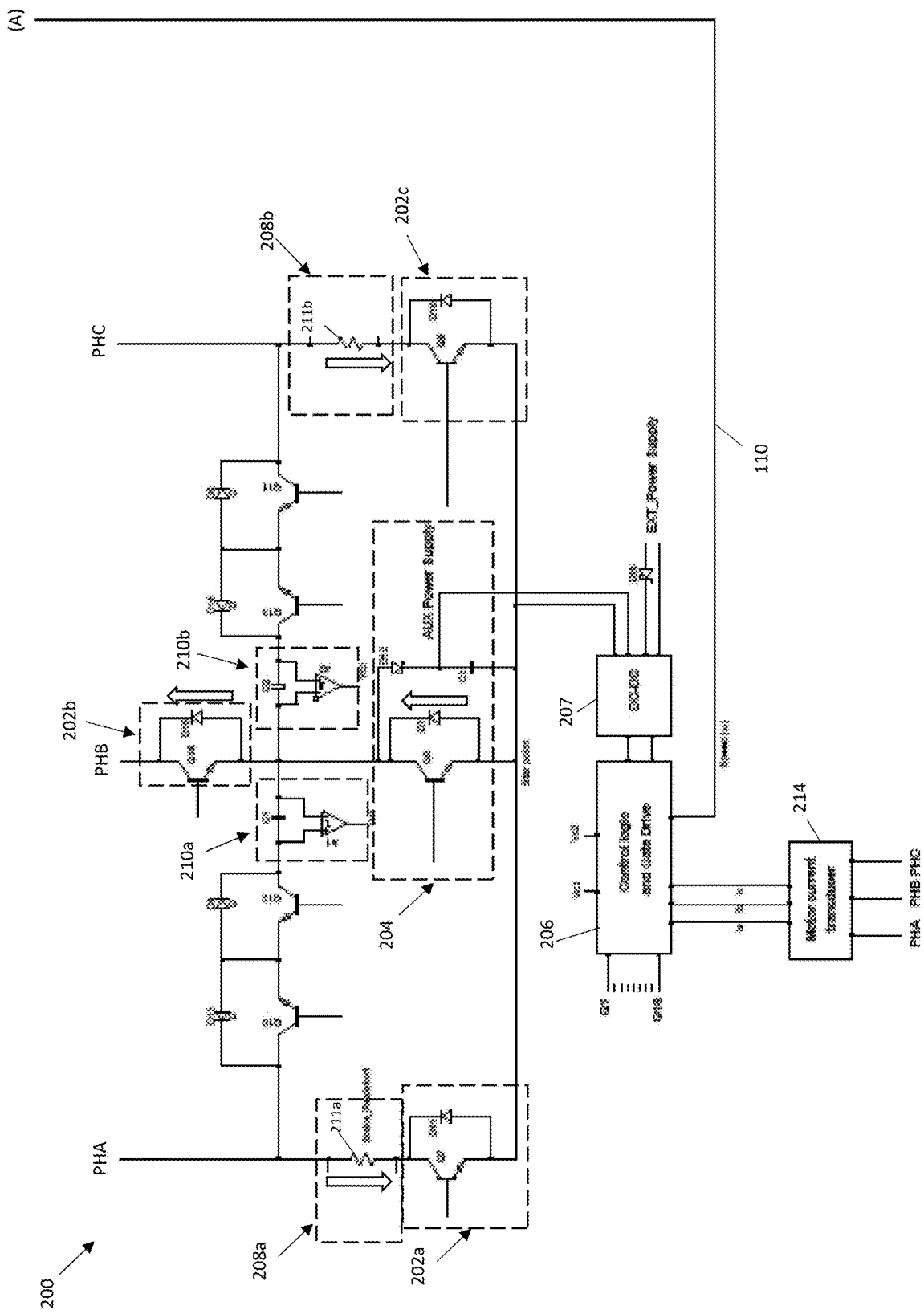
FIG. 6 depicts the regenerative braking circuit of FIG. 3 operating in a dynamic braking mode according to a non-limiting embodiment.

Referring to FIG. 6, the regenerative braking circuit 200 is illustrated operating in the dynamic braking mode according to a non-limiting embodiment. The dynamic braking mode can be invoked after the motor 102 is stopped (e.g. the rotational speed is 0% of the maximum motor speed) and the dynamic braking mode switching circuits 208a and 208b are switched on to stop further displacement of the motor considering a continuous load acts on the rotor (see FIG. 7). In one or more embodiments, a current sensor 214 (e.g., a current transducer) can be provided to measure the DC injection current in the motor stators (e.g., PHA, PHB, PHC). Accordingly, the braking controller 206 can analyze the output of the current sensor 214 to monitor the DC injection current and invoke the dynamic braking mode when the DC injection current falls below a current threshold, e.g., 10% (see FIG. 7). In this manner, the brake resistors included in the dynamic braking mode switching circuits 208a and 208b will inhibit the mechanical movement of the motor 102. In addition, the brake resistors dissipate the circulating current generated by the kinetic energy of the stopped motor 102 due to load inertia and inhibit further rotor displacement.

Figure 8:
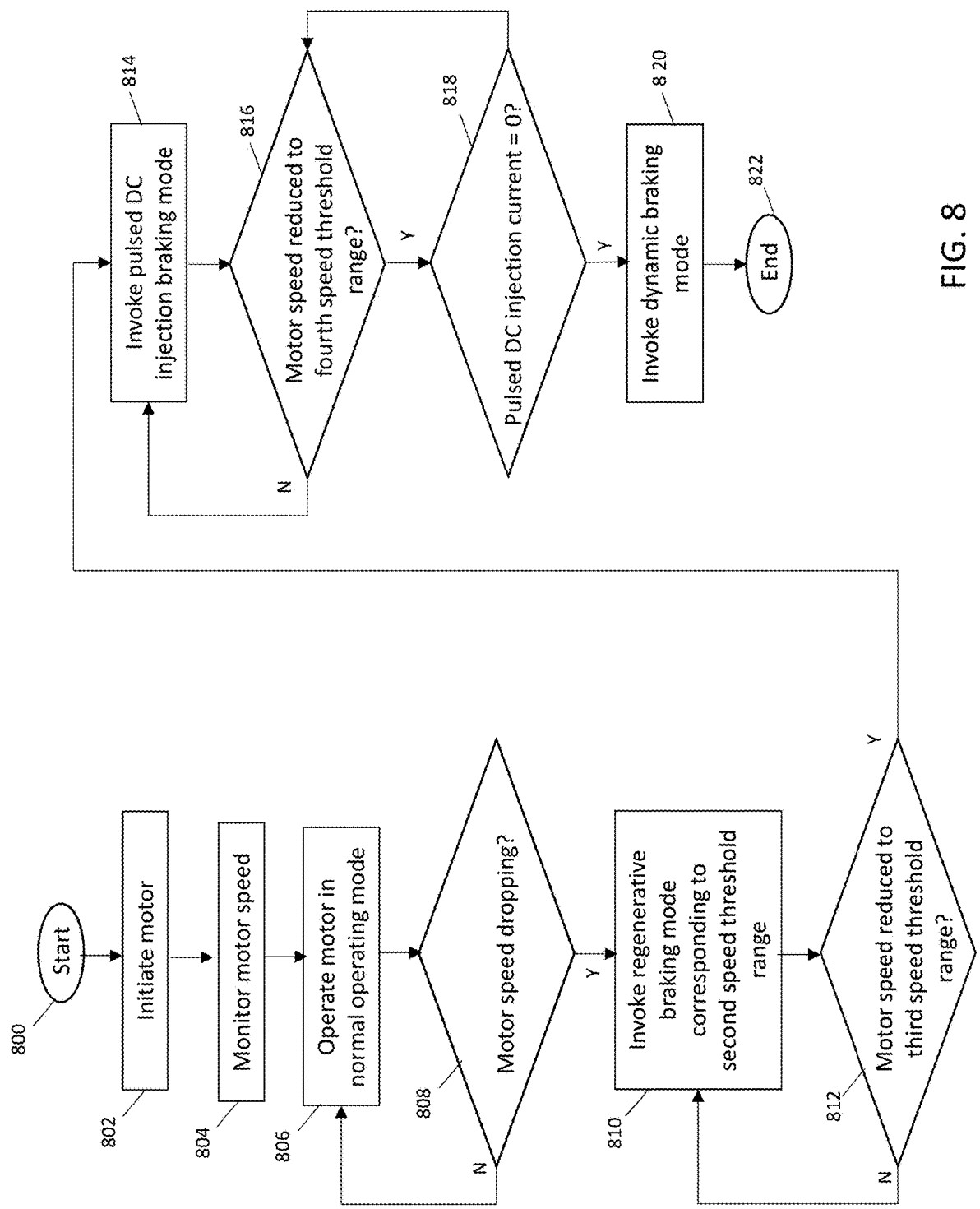
FIG. 8 is a flow diagram illustrating a method of performing regenerative electrical braking according to a non-limiting embodiment.

With reference now to FIG. 8, a method of performing regenerative electrical braking is illustrated according to a non-limiting embodiment. The method begins at operation 800 and a motor is initiated at operation 802. At operation 804 the speed of the motor (e.g., the rotational speed of the motor) is monitored using a speed sensor, for example. At operation 806, the motor is operated in a normal operating mode. Accordingly, the motor can be driven at maximum speed, e.g., at 100% rotational speed. At operation 808, a determination is made as to whether the motor speed decreases. When the motor speed does not decrease, the method returns to operation 806 and continues operating the motor in the normal operating mode.

When, however, the motor speed decreases, a regenerative braking mode is invoked at operation 810. The regenerative braking mode can be invoked when the motor operates in a second speed threshold range. The second speed threshold range can have an upper value, for example, of about 99% of the maximum rotational speed and a lower value of about 30% of the maximum rotational speed.

At operation 812, a determination is made as to whether the motor speed decreases and falls within a third speed threshold range. The third speed threshold range can have an upper value, for example, of about 29% of the maximum rotational speed and a lower value of about 1% of the maximum rotational speed. When the motor speed does not fall within the third speed threshold range, the method returns to operation 810 and continues operating in the regenerative braking mode.

When, however, the motor speed falls to within the third speed threshold range, a pulsed DC injection braking mode is invoked at operation 814. At operation 816 a determination is made as to whether the motor speed decreases and falls within a fourth speed threshold range. The fourth speed threshold range includes, for example, a speed that is less than about 1% of the maximum rotational speed to 0% of the maximum rotational speed. When the motor speed does not fall within the fourth speed threshold range, the method returns to operation 814 and continues operating in the pulsed DC injection braking mode.

When, however, the motor speed falls to within the fourth speed threshold range, a determination is made as to whether the pulsed DC injection current has reached 0 amps at operation 818. In one or more non-limiting embodiments, a current sensor (e.g., a current transducer) can be coupled to the motor in order to measure the DC injection current. When the pulsed DC injection current has not reached 0 amps, the motor returns to operation 816 and continues monitoring the current. When, however, the pulsed DC injection current reaches 0 amps, then the method will invokes the dynamic braking mode at operation 820 and the method ends at operation 822.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A regenerative braking system comprising:
   a motor configured to rotate at a variable rotational speed in response to receiving power from a three-phase power supply;
   a regenerative braking circuit in signal communication with the three-phase power supply and configured to control the rotational speed of the motor; and
   a brake controller in signal communication with the regenerative braking circuit and configured to selectively operate the regenerative braking circuit in a plurality of different braking modes based on the rotational speed of the motor,
   wherein the different braking modes includes a first braking mode that includes a regenerative braking operation and is applied while the motor rotates so as to achieve a first reduced rotational speed that is less than a maximum rotational speed generated, a second braking mode that includes a pulsed DC injection braking operation and is applied while the motor rotates so as to achieve a second reduced rotational speed that is less than the first reduced rotational speed generated, and a third braking mode that includes a dynamic braking operation and is applied after the motor is stopped.

2. The regenerative braking system of claim 1, wherein the first reduced rotational speed ranges from about 99% to about 30% of the maximum speed, and wherein the second reduced rotational speed ranges from about 29% to about 1% of the maximum speed.

3. The regenerative braking system of claim 1, wherein energy stored during the regenerative braking operation drives the pulsed DC injection braking operation to inject a pulsed signal into at least one phase of a stator of the motor.

4. The regenerative braking system of claim 3, wherein the pulsed signal has a variable duty cycle.

5. The regenerative braking system of claim 3, wherein the pulsed signal has a fixed duty cycle.

6. The regenerative braking system of claim 1, wherein first braking mode further includes a partial dynamic braking operation.

7. A method of performing regenerative electrical braking comprises:
rotating a motor configured at a variable rotational speed in response to receiving power from a three-phase power supply; and
controlling the power generated by the three-phase power supply via a regenerative braking circuit; and
selectively operating the regenerative braking circuit in a plurality of different braking modes based on the rotational speed of the motor so as to reduce the rotational speed of the motor,
wherein the different braking modes includes a first braking mode that includes a regenerative braking operation and is applied while the motor rotates so as to achieve a first reduced rotational speed that is less than a maximum rotational speed generated, a second braking mode that includes a pulsed DC injection braking operation and is applied while the motor rotates so as to achieve a second reduced rotational speed that is less than the first reduced rotational speed generated, and a third braking mode that includes a dynamic braking operation and is applied after the motor is stopped.

8. The method of claim 7, wherein the first reduced rotational speed ranges from about 99% to about 30% of the maximum speed, and wherein the second reduced rotational speed ranges from about 29% to about 1% of the maximum speed.

9. The method of claim 7, further comprising utilizing the energy stored during the regenerative braking operation to drive the pulsed DC injection braking operation and inject a pulsed signal into at least one phase of a stator of the motor.

10. The method of claim 9, wherein the pulsed signal has a variable duty cycle.

11. The method of claim 9, wherein the pulsed signal has a fixed duty cycle.

12. The method of claim 7, wherein first braking mode further includes a partial dynamic braking operation.

* * * * *